(12) United States Patent
Wasily

(10) Patent No.: US 8,331,709 B2
(45) Date of Patent: Dec. 11, 2012

(54) FIXED BUFFER REAL-TIME IMAGE COMPRESSION TECHNIQUE

(75) Inventor: Nabil Yousef Wasily, Foothill Ranch, CA (US)

(73) Assignee: Newport Media, Inc., Lake Forest, CA (US)

( * ) Notice: Subject to any disclaimer, the term of this patent is extended or adjusted under 35 U.S.C. 154(b) by 415 days.

(21) Appl. No.: 12/760,429

(22) Filed: Apr. 14, 2010

(65) Prior Publication Data

US 2011/0255800 A1  Oct. 20, 2011

(51) Int. Cl.
*G06K 9/00* (2006.01)

(52) U.S. Cl. ........ 382/251; 382/233; 382/248; 382/250; 382/232

(58) Field of Classification Search .......... 382/232, 382/233, 248, 250, 251; 375/240, 240.15, 375/E7.134
See application file for complete search history.

(56) References Cited

U.S. PATENT DOCUMENTS 6,278,735 B1 * 8/2001 Mohsenian ............. 375/240
7,349,474 B2 * 3/2008 Bagni et al. ............. 375/240.15

FOREIGN PATENT DOCUMENTS

EP  0971542  * 1/2000

* cited by examiner

*Primary Examiner* — Anh Hong Do
(74) *Attorney, Agent, or Firm* — Rahman LLC

(57) ABSTRACT

Performing real-time compression on an image for target buffer fullness includes dividing the image into N macro-blocks, performing a discrete cosine transformation (DCT) on each of the N macro-blocks, defining a Quantization Parameter Scalar (Q) for each of the N macro-blocks of the image on the DCT being performed, initializing the Quantization Parameter Scalar (Q) for the first Macro-block to a value that correlates to a buffer fullness of a previously compressed image, and monitoring the buffer fullness by comparing the buffer fullness with the target buffer fullness. The N macro-blocks include 16×16 macro-blocks. The Q value is increased to a first new value when the buffer fullness is greater than the target buffer fullness. The Q value is decreased to a second new value when the buffer fullness is less than the target buffer fullness.

20 Claims, 5 Drawing Sheets

FIXED BUFFER REAL-TIME IMAGE COMPRESSION TECHNIQUE

BACKGROUND

1. Technical Field

The embodiments herein generally relate to image compression techniques, and, more particularly, to real-time image compression techniques.

2. Description of the Related Art

Image compression is the application of data compression on digital images. In effect, the objective is to reduce redundancy of the image data in order to store and/or transmit data in an efficient form. Image compression can be lossy or lossless. Generally, lossless image compression means all the data from the original file is preserved. Lossy compression, on the other hand, removes some data from the original file and saves the image with a reduced file size.

JPEG (Joint Photographic Experts Group) is a commonly used method of lossy compression for photographic images. The human eye is fairly good at seeing small differences in brightness over a relatively large area, but not so good at distinguishing the exact strength of a high frequency brightness variation. This fact allows one to get away with a greatly reduced amount of information in the high frequency components.

This is performed by simply dividing each component in the frequency domain by a constant for that component, and then rounding to the nearest integer. This is the main lossy operation in the whole process. The degree of compression can be adjusted, allowing a selectable tradeoff between storage size and image quality.

FIG. 1 illustrates a standard known JPEG compression technique. Each image data is divided into 8×8 blocks of pixels and each color component is processed independently. Thus, a pixel is of a single value even in a color image. A discrete cosine transform (DCT) is applied to each 8×8 block. The DCT 102 converts the spatial image representation into a frequency map. In the quantization operation 104, an appropriate amount of information is discarded, and the compressor divides each output value of the DCT 102 by a "quantization coefficient" and rounds the result to an integer. The larger the quantization coefficient, the more data is lost because the actual DCT value is less and less accurate. A zig-zag scan operation 106 converts 8×8 blocks into a 64-point vector. The entropy encoding operation 108 performs an entropy encoding on the quantized coefficient to obtain further compression.

However, the JPEG compression output size is variable according to the image content; i.e., the images with less details results in less output size and images with more details result in more size. To overcome this, image size is controlled by adjusting the values of quantization matrix elements. JPEG allows one matrix to be used and the quantization matrix values are adjusted to control the output size by using a scaling factor.

However, in order to adjust the matrix coefficients for a certain image, prior knowledge of the image content is needed to be able to choose the suitable scaling factor that would control the output size so as not to exceed a certain buffer size (a target buffer size). An early knowledge of the image content is not available in real-time compression as for example in real-time video compression the scene could suddenly change.

SUMMARY

In view of the foregoing, an embodiment herein provides a method of performing real-time compression on an image for target buffer fullness. The method includes dividing the image into N macro-blocks, performing a discrete cosine transformation (DCT) on each of the N macro-blocks, defining a quantization parameter scalar (Q) for each of the N macro-blocks of the image on the DCT being performed, initializing the quantization parameter scalar (Q) for the first macro-block to a value that correlates to a buffer fullness of a previously compressed image, and monitoring the buffer fullness by comparing the buffer fullness with the target buffer fullness. The N macro-blocks include 16×16 macro-blocks.

The Q value is increased to a first new value when the buffer fullness is greater than the target buffer fullness. The first new value equals the Q value plus a difference of the comparison of the buffer fullness with the target buffer fullness ($\Delta$). The Q value is decreased to a second new value when the buffer fullness is less than the target buffer fullness. The second new value equals the Q value minus a difference of the comparison of the buffer fullness with the target buffer fullness ($\Delta$). A quantization matrix is biased to small values when the buffer fullness is small at the start of the image. The Q values range from 1 to 64 where small values are close to 1. The quantization matrix biases to large values when the buffer fullness is substantially full at the end of the image. The Q values range from 1 to 64 where large values are close to 64.

The DCT converts the image into a frequency map. An appropriate amount of information is discarded on the DCT being performed. The compression process divides each DCT output by a quantization coefficient and rounds-off the result to an integer. The compression on the image further includes performing a zig-zag scan on the output being quantized, and performing an entropy coding on the quantization coefficient being zig-zag scanned.

In another aspect, an apparatus for performing real-time compression on an image for a target buffer fullness is provided. The image includes of 16×16 macro-blocks. The apparatus includes a buffer that stores the image, a DCT unit that performs a DCT on each of the 16×16 blocks. The DCT unit converts the image into a frequency map. A quantization unit that quantizes an output of the DCT. A selected amount of information is discarded. The compression divides each DCT output by a quantization coefficient and rounds-off the result to an integer.

The quantization unit includes a control unit that defines a quantization parameter scalar (Q) for each N macro-blocks of the image, initializes Q to a value that correlates to a buffer fullness of a previously compressed image, monitors the buffer fullness and compares the buffer fullness with the target buffer fullness, and sets an appropriate Q value to be used in the quantization unit. A zig-zag scan unit that performs a zig-zag scan on the output being quantized. An entropy coding unit that performs entropy coding on the quantization coefficient being zig-zag scanned.

The control unit increases the Q value to a first new value when the buffer fullness is greater than the target buffer fullness. The first new value equals the Q value plus a difference of the comparison of the buffer fullness with the target buffer fullness. The control unit decreases the Q value to a second new value when the buffer fullness is less than the target buffer fullness ($\Delta$). The second new value equals the Q value minus a difference of the comparison of the buffer fullness with the target buffer fullness ($\Delta$).

The control unit further biases the quantization matrix to small values when the buffer fullness is small at the start of the image. The Q values range from 1 to 64 where small values are close to 1. The control unit biases the quantization matrix to large values when the buffer fullness is substantially full at the end of the image. The Q values range from 1 to 64 where large values are close to 64. The quantization unit divides a large coefficient of the DCT to represent a data in a least output on the buffer fullness being substantially full.

In yet another aspect, a system for performing real-time compression on an image for a target buffer fullness is provided. The system includes means for dividing the image into N macro-blocks, means for performing a DCT on each of the N macro-blocks, means for quantizing each of the N macro-blocks, means for defining a quantization matrix (Q*[M]) for each of the N macro-blocks, means for initializing Q to a value that correlates to a buffer fullness of a previously compressed image, means for monitoring the buffer fullness by comparing the buffer fullness with the target buffer fullness, means for increasing the Q value to a first new value when the buffer fullness is greater than the target buffer fullness, and means for decreasing the Q value to a second new value when the buffer fullness is greater than the target buffer fullness. The quantization matrix divides a large coefficient of the DCT to represent a data in a least output on the buffer fullness being substantially full. The Q values range from 1 to 64 where large values are close to 64. The system further includes means for performing a zig-zag scan for each of the N macro-blocks, and means for performing entropy encoding for each of the N macro-blocks. The N macro-blocks is 16×16 macro-blocks.

The system further includes means for biasing the quantization matrix to small values when the buffer fullness is small at the start of the image. The quantization matrix Q values range from 1 to 64 where small values are close to 1. Means are included for biasing the quantization matrix to large values when the buffer fullness is substantially full at the end of the image, wherein the quantization matrix Q values range from 1 to 64 where large values are close to 64. The DCT converts the image into a frequency map. Moreover, an appropriate amount of information is discarded on the DCT being performed. The system further comprises means for dividing each DCT output by a quantization coefficient and rounding-off the result to an integer.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
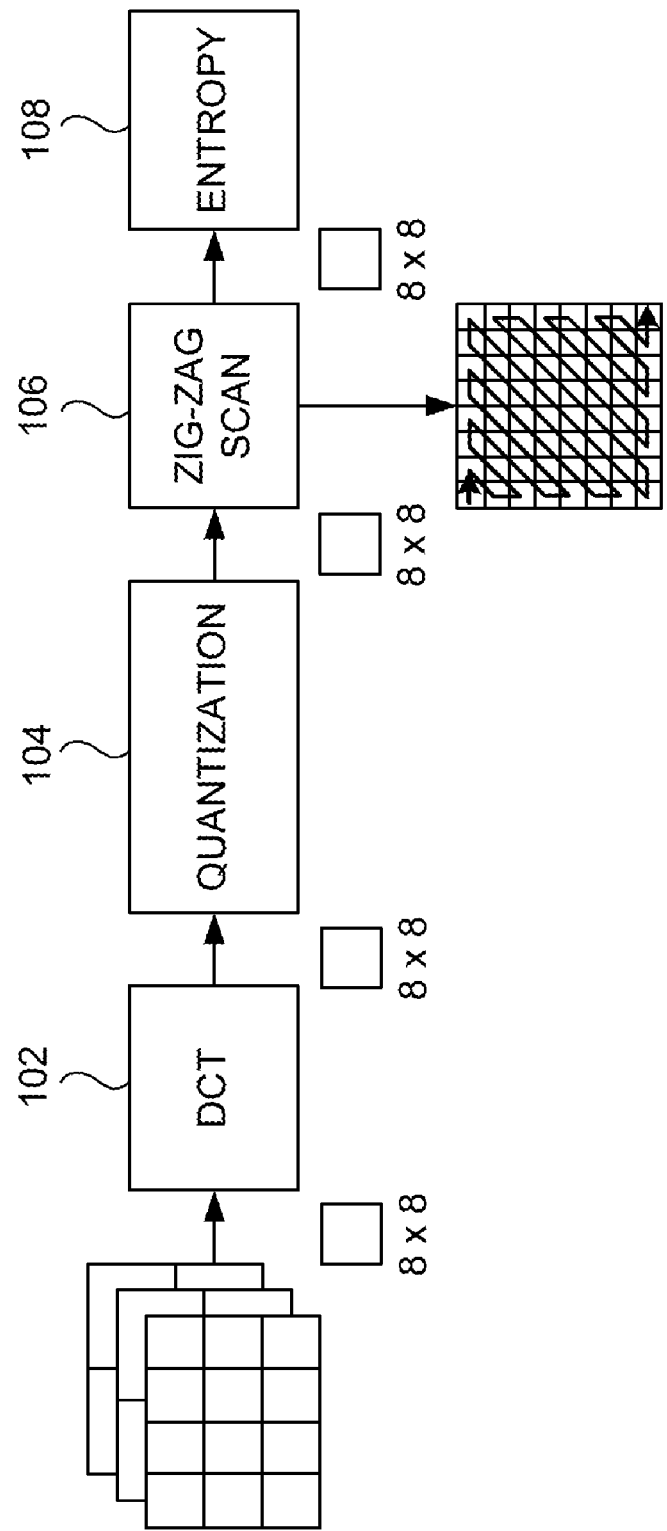
FIG. 1 illustrates a standard known JPEG compression technique.
Figure 2:
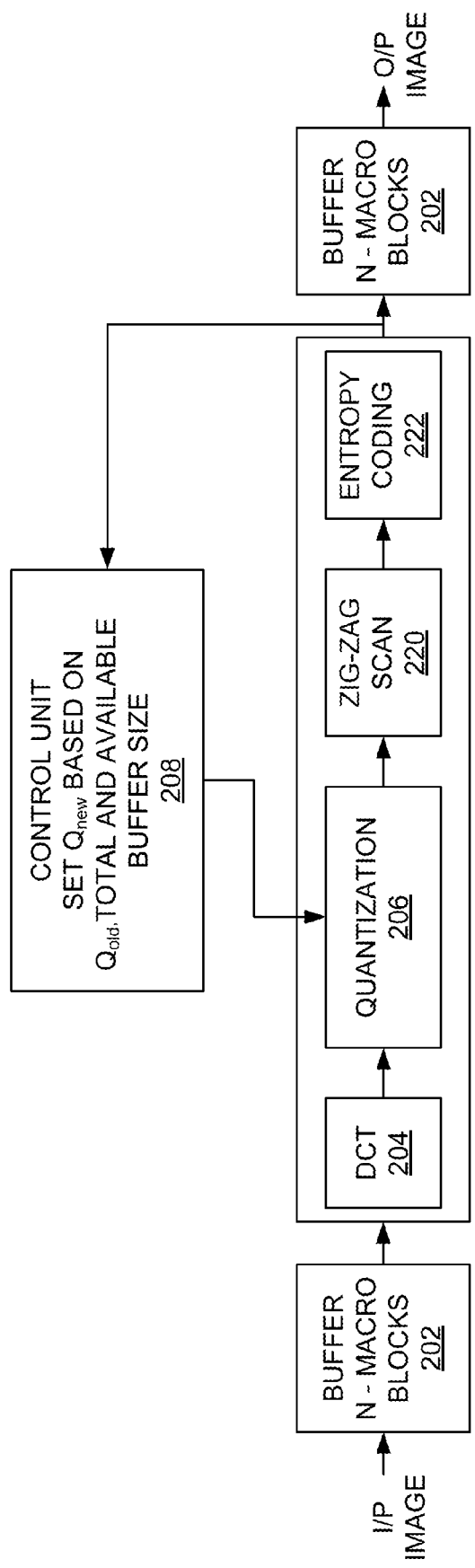
FIG. 2 illustrates a block diagram of a JPEG real-time compression technique on an image for target buffer fullness according to an embodiment herein.
Figure 3:
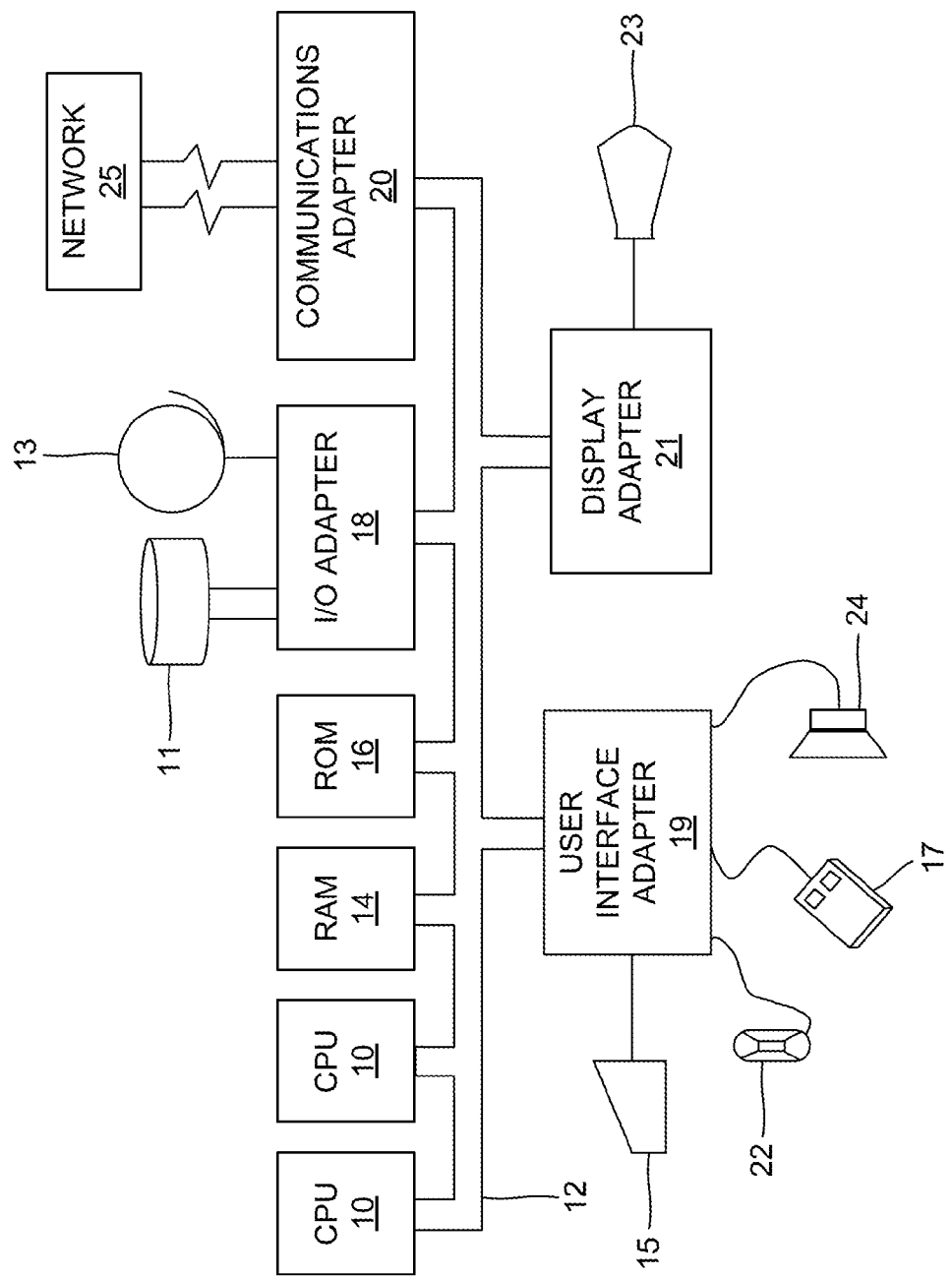
FIG. 3 illustrates a schematic diagram of a computer architecture used in accordance with the embodiments herein.
Figure 4:
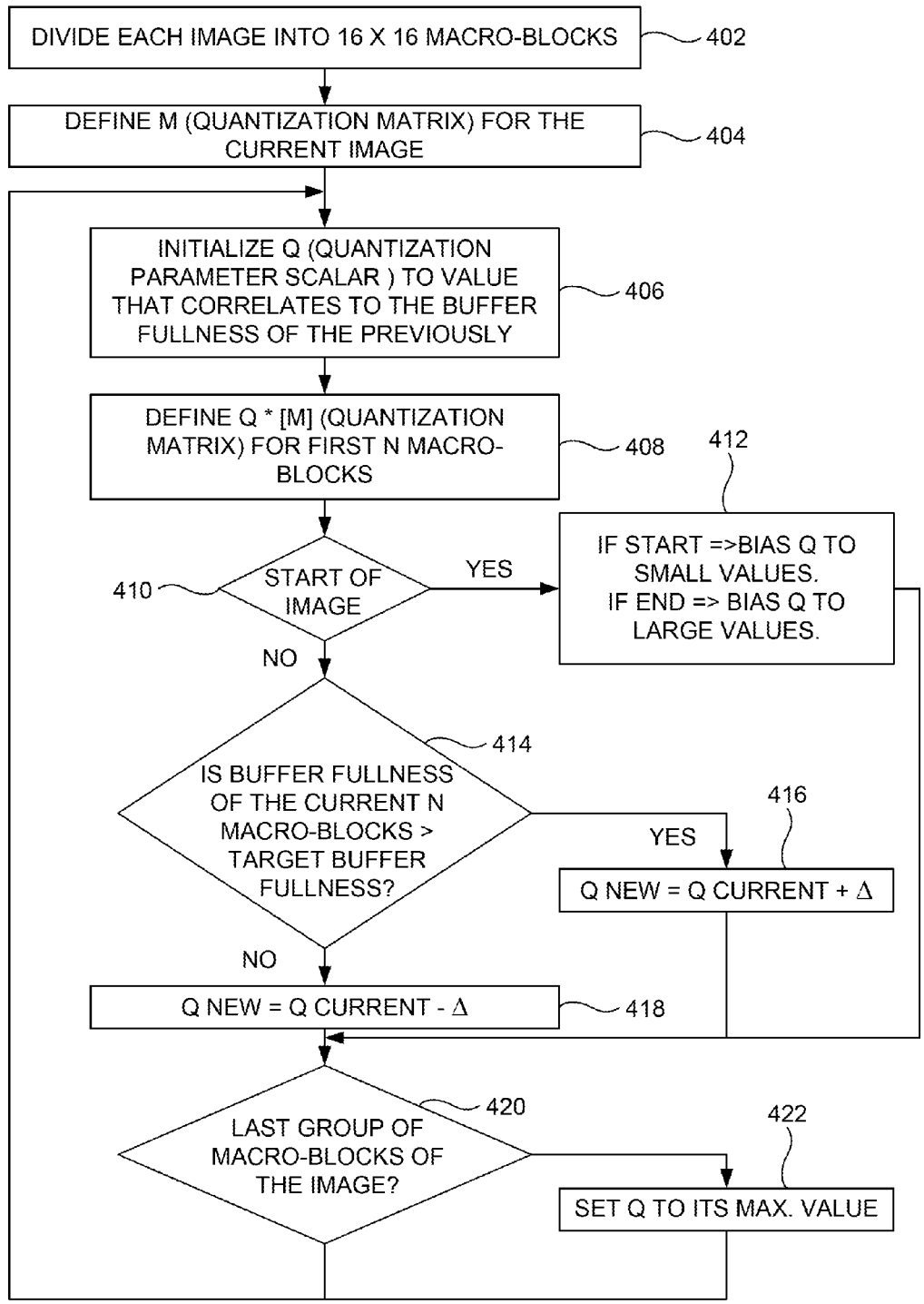
FIG. 4 is a flow chart illustrating a method of performing quantization on an image using the quantization unit of FIG. 2 according to an embodiment herein.

The embodiments herein provide a method of performing a compression real-time on an image by adjusting the quantization matrix coefficients that controls the size such that it does not exceed the target buffer size. Referring now to the drawings, and more particularly to FIGS. 2 through 4, where similar reference characters denote corresponding features consistently throughout the figures, there are shown preferred embodiments.

FIG. 2 illustrates a block diagram of a JPEG real-time compression technique on an image for target buffer fullness according to an embodiment herein. The block diagram includes a plurality of buffers 202, a DCT unit 204, a quantization unit 206, a control unit 208, a zig-zag scan unit 220, and an entropy coding unit 222.

The image is stored in a buffer 202 at the input to unit 204 in the form of N macro-blocks (i.e., 16×16 blocks). The JPEG operation then starts on each 16×16 macro-block, and it starts with the DCT unit 204. The output of the DCT unit 204 is fed as an input to the quantization unit 206. The control unit 208 defines a quantization parameter scalar (Q) for the first macro-block according to the buffer size and the quantization parameter scalar of the previous image. Then quantization unit 206 defines a quantization matrix (Q*[M]). The zig-zag scan unit 220 converts the matrix that is quantized into a vector form. The entropy coding unit 222 performs entropy coding on the quantized coefficients that is received from the zig-zag scan unit 220.

The control unit 208 monitors the buffer fullness and compares the buffer fullness with the target buffer fullness. The control unit 208 adjusts the value of Q based on that comparison for each of the N macro-blocks of the image. In one embodiment, the control unit 208 increases the Q value to a first new value if the buffer fullness is greater than the target buffer fullness. The first new value equals the Q value plus a difference of the comparison of the buffer fullness with the target buffer fullness ($\Delta$) which is determined in accordance with equation: $Q_{First\ New} = Q + \Delta$.

In another embodiment, the control unit 208 decreases the Q value to a second new value if the buffer fullness is lesser than the target buffer fullness. The second new value equals the Q value minus a difference of the comparison of the buffer fullness with the target buffer fullness ($\Delta$) which is determined according to equation: $Q_{Second\ New} = Q - \Delta$. The control unit 208 biases the value of the quantization matrix (Q*[M]) based on a size of the buffer fullness. In one embodiment, biasing of the quantization matrix to small values occurs if the buffer fullness is small at the start of the image. The Q values range from 1 to 64 where small values are close to 1.

In another embodiment, the control unit 208 biases the quantization matrix to large values if the buffer fullness is substantially full at the end of the image. The Q values range from 1 to 64 where large values are close to 64. For large DCT coefficients, the quantization matrix unit 210 divides the large DCT coefficients to represent the data in a least output as the Buffer is substantially full.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can comprise hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments herein is depicted in FIG. 3. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example. The method for frame buffer video compression on an input video stream efficiently allocates and utilizes memory used for storing reference frames in a video decoder. The allocated memory is adapted for compressing a given reference frame based on the number of needed frames at the frame buffer at a given instance. If only one reference frame is needed a quantization of the compression technique is adjusted accordingly to get better picture quality and avoid compression artifacts.

FIG. 4, with reference to FIGS. 2 and 3, is a flow chart illustrating a method of quantization on an image using the quantization unit 206 of FIG. 2 according to an embodiment herein. In step 402, the image is divided into N macro-blocks. The N macro-blocks include 16×16 macro-blocks. In step 404, a quantization matrix $Q^*[M]$ is defined for the current image. In step 406, the quantization parameter scalar (Q) for the first macro-block is initialized to a value that correlates to a buffer fullness of a previously compressed image. In step 408, $Q^*[M]$ (quantization matrix) for first N macro-blocks is defined. In step 410, it is checked whether it is start of image. If it is the start of an image, Q is biased to small values, and if it is an end of an image then Q is biased to large values in step 412 and step 420 is performed, else it is checked whether the buffer fullness of the current N macro-blocks is greater than target buffer fullness in step 412. If the buffer fullness of the current N macro-blocks is greater than the target buffer fullness, then the Q value is increased to a first new value. The first Q new value is increased in step 416, and equals the Q value plus a difference of the comparison of the buffer fullness with the target buffer fullness ($\Delta$) and is given in accordance with the equation in accordance with the equation: Q New=Q current+$\Delta$.

Else, (if No) then the Q value is decreased to a second new value in step 418. The second new value equals the Q value minus a difference of the comparison of the buffer fullness with the target buffer fullness (Δ) and is given in accordance with the equation: Q New=Q current−Δ. In step 420, it is checked whether it is a last group of macro-blocks of the image. If Yes, Q is set to its maximum in step 422 and step 406 is repeated. Else (if No), then step 406 is repeated.

Figure 5:
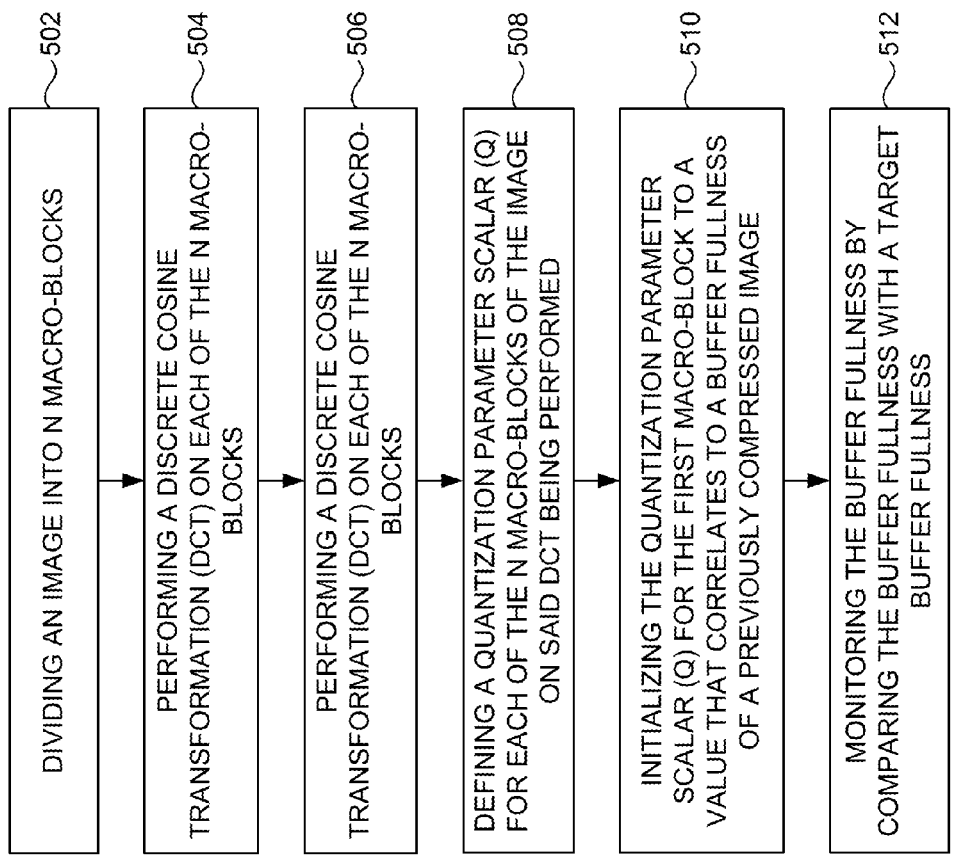
FIG. 5 is a flow diagram illustrating a method of performing real-time compression on an image for target buffer fullness according to a second embodiment herein.

FIG. 5, with reference to FIGS. 2 through 4, is a flow diagram illustrating a method of performing real-time compression on an image for target buffer fullness according to a second embodiment herein. In step 502, the image is divided into N macro-blocks. The N macro-blocks include 16×16 macro-blocks. In step 504, a discrete cosine transformation (DCT) is performed on each of the N macro-blocks. The DCT converts the image into a frequency map. An appropriate amount of information is discarded on the DCT being performed. The compression process divides each DCT output by a quantization coefficient and rounds-off the result to an integer. In step 506, a quantization parameter scalar (Q) for each of the N macro-blocks of the image is defined on the DCT being performed. In step 508, the quantization parameter scalar (Q) is initialized for the first macro-block to a value that correlates to a buffer fullness of a previously compressed image. In step 510, the buffer fullness is monitored and compared with the target buffer fullness.

The method of performing real-time compression on the image for target buffer fullness further includes increasing Q value to a first new value when the buffer fullness is greater than the target buffer fullness. The first new value equals the Q value plus a difference of the comparison of the buffer fullness with the target buffer fullness (Δ). The Q value is decreased to a second new value when the buffer fullness is less than the target buffer fullness. The second new value equals the Q value minus a difference of said comparison of said buffer fullness with said target buffer fullness (Δ).

The method further includes biasing a quantization matrix is biased to small values when the buffer fullness is small at the start of the image. The Q values range from 1 to 64 where small values are close to 1. The quantization matrix is biased to large values when the buffer fullness is substantially full at the end of the image where the Q values range from 1 to 64 where large values are close to 64. The method of performing real-time compression on the image for target buffer fullness further includes performing a zig-zag scan (using a zig-zag scan unit 220 of FIG. 2) on the output being quantized, and performing an entropy coding (using entropy encoding unit 222) on the quantization coefficient being Zig-zag scanned.

The method of an image compression in real-time is performed by defining a (Q*[M]) matrix for each macro-block of the image where Q is initialized to a value that correlates to a buffer fullness of a previously compressed image. The buffer fullness is compared with the target buffer fullness and accordingly the Q value is adjusted such that the target buffer size does not exceed a predetermined threshold. The embodiments herein may be implemented in an analog television application.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of performing real-time compression on an image for target buffer fullness, said method comprising:
    storing an image in a buffer;
    dividing said image into N macro-blocks, wherein said N macro-blocks comprises 16×16 macro-blocks;
    conducting a compression process of said image by performing a discrete cosine transformation (DCT) on each of said N macro-blocks;
    defining a quantization parameter scalar (Q value) for each said N macro-blocks of said image on said DCT being performed;
    initializing said quantization parameter scalar (Q value) for the first macro-block to a value that correlates to a buffer fullness of a previously compressed image;
    monitoring said buffer fullness by comparing said buffer fullness with said target buffer fullness; and
    outputting results of the monitoring step on a display device.

2. The method of claim 1, further comprising increasing the Q value to a first new value when said buffer fullness is greater than said target buffer fullness, wherein said first new value equals said Q value plus a difference of said comparison of said buffer fullness with said target buffer fullness (Δ).

3. The method of claim 1, further comprising decreasing the Q value to a second new value when said buffer fullness is less than said target buffer fullness, wherein said second new value equals said Q value minus a difference of said comparison of said buffer fullness with said target buffer fullness (Δ).

4. The method of claim 1, further comprising biasing a quantization matrix to small values when said buffer fullness is small at a start of said image, wherein said Q values range from 1 to 64 where small values are close to 1.

5. The method of claim 1, further comprising biasing said quantization matrix to large values when said buffer fullness is substantially full at an end of said image, wherein said Q values range from 1 to 64 where large values are close to 64.

6. The method of claim 1, wherein said DCT converts said image into a frequency map.

7. The method of claim 1, wherein an appropriate amount of information is discarded on said DCT being performed, and wherein said compression process divides each DCT output by a quantization coefficient and rounds-off the result to an integer.

8. The method of claim 7, wherein compression on said image comprises:
    performing a zig-zag scan on the output being quantized; and
    performing an entropy coding on said quantization coefficient being zig-zag scanned.

9. An apparatus for performing real-time compression on an image for a target buffer fullness, said image comprising 16×16 macro-blocks, said apparatus comprising:
    a buffer that stores said image;
    a discrete cosine transformation (DCT) unit that performs a DCT on each said 16×16 macro-blocks, wherein said DCT unit converts said image into a frequency map;
    a quantization unit that quantizes an output of said DCT, wherein a selected amount of information is discarded, wherein said compression divides each DCT output by a quantization coefficient and rounds-off the result to an integer, wherein said quantization unit comprises:
        a control unit that defines a quantization parameter scalar (Q) for each N macro-blocks of said image, wherein said control unit initializes Q to a value that correlates to a buffer fullness of a previously compressed image, wherein said control unit monitors said buffer fullness and compares said buffer fullness with a target buffer fullness, and wherein said control unit sets an appropriate Q value to be used in said quantization unit;

a zig-zag scan unit that performs a zig-zag scan on the output being quantized; and an entropy coding unit that performs entropy coding on said quantization coefficient being zig-zag scanned.

10. The apparatus of claim 9, wherein said control unit increases said Q value to a first new value when said buffer fullness is greater than said target buffer fullness, and wherein said first new value equals said Q value plus a difference of said comparison of said buffer fullness with said target buffer fullness ($\Delta$).

11. The apparatus of claim 10, wherein said control unit decreases said Q value to a second new value when said buffer fullness is less than said target buffer fullness, and wherein said second new value equals said Q value minus a difference of said comparison of said buffer fullness with said target buffer fullness ($\Delta$).

12. The apparatus of claim 10, wherein said control unit biases a quantization matrix to small values when said buffer fullness is small at a start of said image, and wherein said Q values range from 1 to 64 where small values are close to 1.

13. The apparatus of claim 10, wherein said control unit biases a quantization matrix to large values when said buffer fullness is substantially full at the end of said image, and wherein said Q values range from 1 to 64 where large values are close to 64.

14. The apparatus of claim 10, wherein said quantization unit divides a large coefficient of said DCT to represent a data in a least output on said buffer fullness being substantially full.

15. A system for performing real-time compression on an image for a target buffer fullness, said system comprising:

means for dividing said image into N macro-blocks, wherein said N macro-blocks comprises 16×16 macro-blocks;

means for performing a discrete cosine transformation (DCT) on each said N macro-blocks;

means for quantizing each of said N macro-blocks;

means for defining a quantization matrix (Q*[M]) for each said N macro-blocks;

means for initializing Q to a value that correlates to a buffer fullness of a previously compressed image;

means for monitoring said buffer fullness by comparing said buffer fullness with a target buffer fullness;

means for increasing the Q value to a first new value when said buffer fullness is greater than said target buffer fullness;

means for decreasing said Q value to a second new value when said buffer fullness is greater than said target buffer fullness;

means for performing a zig-zag scan for each of said N macro-blocks; and means for performing entropy encoding for each of said N macro-blocks.

16. The system of claim 15, further comprising means for biasing said quantization matrix to small values when said buffer fullness is small at a start of said image, wherein said Q values range from 1 to 64 where small values are close to 1.

17. The system of claim 15, further comprising means for biasing said quantization matrix to large values when said buffer fullness is substantially full at an end of said image, wherein said Q values range from 1 to 64 where large values are close to 64.

18. The system of claim 15, wherein said DCT converts said image into a frequency map.

19. The system of claim 15, wherein an appropriate amount of information is discarded on said DCT being performed.

20. The system of claim 19, further comprising means for dividing each DCT output by a quantization coefficient and rounding-off the result to an integer.

* * * * *